US012603241B2

(12) United States Patent
Ao et al.

(10) Patent No.: US 12,603,241 B2
(45) Date of Patent: Apr. 14, 2026

(54) CIRCUIT BREAKER AND OPERATING MECHANISM THEREOF

(71) Applicant: Chint Low Voltage Electrical Technology Co., Ltd., Shanghai (CN)

(72) Inventors: Denggui Ao, Shanghai (CN); Dengyu Lu, Shanghai (CN); Lijun Yan, Shanghai (CN); Yongfu Xu, Shanghai (CN); Xiaoqin Yuan, Shanghai (CN)

(73) Assignee: Chint Low Voltage Electrical Technology Co., Ltd. (CN)

( * ) Notice: Subject to any disclaimer, the term of this patent is extended or adjusted under 35 U.S.C. 154(b) by 238 days.

(21) Appl. No.: 18/557,152

(22) PCT Filed: Aug. 16, 2022

(86) PCT No.: PCT/CN2022/112757
§ 371 (c)(1),
(2) Date: Oct. 25, 2023

(87) PCT Pub. No.: WO2023/020483
PCT Pub. Date: Feb. 23, 2023

(65) Prior Publication Data

US 2024/0212963 A1 Jun. 27, 2024

(30) Foreign Application Priority Data

Aug. 20, 2021 (CN) ......................... 202110962095.5

(51) Int. Cl.
*H01H 71/52* (2006.01)
*H01H 73/04* (2006.01)

(52) U.S. Cl.
CPC .......... *H01H 71/521* (2013.01); *H01H 73/04* (2013.01)

(58) Field of Classification Search
CPC ......... H01H 2223/04; H01H 2223/044; H01H 2223/0032; H01H 2223/034; H01H 71/52;
(Continued)

(56) References Cited

U.S. PATENT DOCUMENTS 4,167,720 A * 9/1979 Krasser .................. H01H 71/54 337/60
6,087,913 A * 7/2000 Castonguay ......... H01H 71/525 218/7
2013/0088310 A1 4/2013 Yang et al.

FOREIGN PATENT DOCUMENTS

CN 103531407 A 1/2014
CN 203466147 U 3/2014
(Continued)

OTHER PUBLICATIONS

International Search Report mailed Nov. 15, 2022 in corresponding PCT International Application No. PCT/CN2022/112757.

*Primary Examiner* — Anthony R Jimenez
(74) *Attorney, Agent, or Firm* — OSTROLENK FABER LLP

(57) ABSTRACT

An operating mechanism with a second connecting rod assembly that includes a second crank pivotally disposed around a tenth axis, a third connecting rod, and a third crank pivotally disposed around an eleventh axis. The second crank is rotatably connected to the third connecting rod through an eighth shaft, the third connecting rod is rotatably connected to the third crank through a ninth shaft, a first connecting rod assembly is rotatably connected to the second crank through a seventh shaft, and all the shafts and the axes are spaced in parallel. The tenth axis or the eleventh axis coincides with a rotation axis of a moving contact mechanism, and the eighth shaft or the ninth shaft rotates the moving contact mechanism. The operating mechanism pro-
(Continued)

vides a plurality of modes of connection with the moving contact mechanism, thereby facilitating the design of a contact system of the circuit breaker.

11 Claims, 14 Drawing Sheets

(58) Field of Classification Search
CPC .. H01H 71/5201; H01H 73/04; H01H 25/006; H01H 25/00; H01H 25/002; H01H 2231/026
See application file for complete search history.

(56) References Cited

FOREIGN PATENT DOCUMENTS

| | | | |
|---|---|---|---|
| CN | 208077912 | U | 11/2018 |
| CN | 209249396 | U | 8/2019 |
| CN | 211828661 | U | 10/2020 |
| CN | 216749781 | U | 6/2022 |

* cited by examiner

CIRCUIT BREAKER AND OPERATING MECHANISM THEREOF

CROSS-REFERENCE TO RELATED APPLICATIONS

The present application is a 35 U.S.C. §§ 371 national stage application of International Application No. PCT/CN2022/112757, filed Oct. 16, 2022, which claims priority to Chinese Patent Application No. 202110962095.5, filed Aug. 20, 2021, the contents of which are incorporated herein by reference.

TECHNICAL FIELD

The present invention relates to the field of low-voltage electrical appliances, and more particularly to an operating mechanism of a circuit breaker and the circuit breaker including the operating mechanism.

BACKGROUND ART

A connecting relationship and relative positions of an operating mechanism and a contact system of the existing circuit breaker are fixed, which causes restrictions on the design of the contact system.

With the continuous improvement of a power system, the voltage requirements for a circuit breaker are getting higher and higher. In order to meet the needs of the circuit breaker for a high breaking voltage, increasing an opening distance between a moving contact and a static contact is a common design method, which generally includes the following two design schemes.

The first scheme is to increase a length of a moving contact arm, but has the following disadvantages: in order to ensure the reliable connection performance between the moving contact and the static contact, there must be sufficient pressure between the moving contact and the static contact: with the lengthening of a moving contact arm, a required contact spring force will increase sharply, and the force of a spring of the operating mechanism will also increase sharply: and meanwhile, the service life of the circuit breaker is shortened due to the increase in operating force.

The second scheme is to increase an opening distance by adjusting a four-link structure of the existing operating mechanism. However, due to a high correlation between movements of respective connecting rods in the four-link structure, if a contact support rotates at a larger angle while driving the moving contact to be disconnected, a jump buckle and an upper connecting rod also need to rotate at a larger angle. However, the rotation angle of the jump buckle is directly related to a lock buckle and a handle, such that the handle and the lock buckle need to rotate at a larger angle, which puts forward higher requirements for space. In addition, the length, position, elasticity and the like of the spring adapted to the jump buckle change, and the larger angle of rotation of the jump buckle will slow down a movement speed of the entire mechanism.

SUMMARY OF THE INVENTION

The present invention aims to overcome the defects of the prior art, and to provide an operating mechanism of a circuit breaker, which provides a variety of modes to connect with a moving contact mechanism, and thus facilitates the design of a contact system of the circuit breaker. The present invention further provides a circuit breaker including the operating mechanism, which can flexibly adjust a position relationship between the operating mechanism and the moving contact mechanism as needed.

In order to achieve the above object, the present invention adopts the following technical solutions:

An operating mechanism of a circuit breaker, comprising a mechanism bracket, a jump buckle, a lock buckle, a rocker arm assembly, an energy storage spring, a first crank, and a first connecting rod assembly, wherein the jump buckle, the lock buckle and the rocker arm assembly are pivotally disposed on the mechanism bracket respectively: the lock buckle is in locking fit with the jump buckle: one end of the first crank is rotatably connected to the jump buckle, and the other end of the first crank is connected to the first connecting rod assembly through a fifth shaft: one end of the energy storage spring is connected to the fifth shaft, and the other end of the energy storage spring is rotatably connected to the rocker arm assembly: the operating mechanism further comprises a second connecting rod assembly: the second connecting rod assembly comprises a second crank pivotally disposed around a tenth axis, a third connecting rod, and a third crank pivotally disposed around an eleventh axis: the second crank is also rotatably connected to the third connecting rod through an eighth shaft: the third connecting rod is also rotatably connected to the third crank through a ninth shaft: the first connecting rod assembly is also rotatably connected to the second crank through a seventh shaft: the tenth axis, an axis of the eighth shaft, an axis of the ninth shaft and the eleventh axis are spaced in parallel; an axis of the seventh shaft and the tenth axis are spaced in parallel: the tenth axis coincides with a rotation axis of the moving contact mechanism of the circuit breaker, and the eighth shaft is in driving connection to the moving contact mechanism to drive the moving contact mechanism to rotate: or the eleventh axis coincides with the rotation axis of the moving contact mechanism, and the ninth shaft is in driving connection to the moving contact mechanism to drive the moving contact mechanism to rotate.

Preferably, the second crank is pivotally disposed around the tenth axis on the mechanism bracket or the circuit breaker housing of the circuit breaker: the third crank is pivotally disposed around the eleventh axis on the mechanism bracket or the circuit breaker housing: one end of the second crank is pivotally disposed around the tenth axis on the mechanism bracket, and the other end of the second crank is rotatably connected to one end of the third connecting rod through the eighth shaft: the seventh shaft is located between both ends of the second crank; the other end of the third connecting rod is rotatably connected to one end of the third crank through the ninth shaft: and the other end of the third crank is pivotally disposed around the eleventh axis on the mechanism bracket.

Preferably, the tenth axis, an axis of the eighth shaft, an axis of the ninth shaft and the eleventh axis are located at four vertices of a parallelogram, respectively.

Preferably, the first connecting rod assembly comprises a first connecting rod, a sliding block and a second connecting rod: the operating mechanism further comprises sliding rails; the first crank is rotatably connected to one end of the first connecting rod through a fifth shaft, and the other end of the first connecting rod is rotatably connected to the sliding block: the sliding block is also rotatably connected to one end of the second connecting rod, and the other end of the second connecting rod is rotatably connected to the second crank through the seventh shaft: and the sliding block is slidably disposed in the sliding rails.

Preferably, the sliding rails are disposed on the mechanism bracket or disposed on the circuit breaker housing of the circuit breaker.

Preferably, the sliding block is in limiting fit with the sliding rails to prevent the sliding block from sliding while the operating mechanism is in an opened state or a tripped state.

Preferably, the sliding block comprises a sliding shaft and track blocks, with one track block being disposed on each of both ends of the sliding shaft: and each track block is in sliding and limiting fit with one sliding rail.

Preferably, two ends of a swing stroke of the rocker arm assembly are a first stroke end and a second stroke end, and two ends of the energy storage spring, which are connected to the rocker arm assembly and the fifth shaft, are a first spring end and a second spring end, respectively:

- in the case that the operating mechanism is in a closed state, the rocker arm assembly swings toward the second stroke end and drives the first spring end to rotate around the second spring end, until the energy storage spring turns past a first dead center position: the energy storage spring drives the first crank to rotate in a second direction and drives the rocker arm assembly to swing to the second stroke end: the first crank drives the sliding block through the first connecting rod to slide along the sliding rails till being limiting fit with the first crank, thereby preventing the first crank from rotating in the second direction: the operating mechanism is switched to an opened state: and
- in the case that the operating mechanism is in the opened state, the rocker arm assembly swings toward the first stroke end and drives the first spring end to rotate around the second spring end, until the energy storage spring turns past the first dead center position: the energy storage spring drives the first crank to rotate in the first direction, such that a crank limiting portion of the first crank is in limiting fit with the jump buckle, thereby preventing the first crank from rotating in the first direction: meanwhile, the energy storage spring drives the rocker arm assembly to swing to the first stroke end, and the operating mechanism is switched to a closed state: and the first direction and the second direction are opposite to each other.

Preferably, the operating mechanism further comprises a re-buckle pivotally disposed on the mechanism bracket, the re-buckle being in limiting fit with the lock buckle:

- in the case that the operating mechanism is in the closed state, the re-buckle rotates to release the limiting fit from the lock buckle, and the lock buckle rotates to release the locking fit from the jump buckle: the jump buckle rotates and drives the first crank to rotate synchronously, the first crank drives the sliding block through the first connecting rod to slide along the sliding rails till being in limiting fit with the sliding rails, thereby preventing the jump buckle from continuing to rotate: the energy storage spring drives the rocker arm assembly to swing to the second stroke end till a reset structure of the rocker arm assembly is in limiting fit with the jump buckle, and the operating mechanism is switched to a tripped state: and
- in the case that the operating mechanism is in the tripped state, the rocker arm assembly swings to the second stroke end, and the rocker arm assembly drives the jump buckle through the reset structure to rotate to be in locking fit with the lock buckle: and meanwhile, the lock buckle rotates to be in limiting fit with the re-buckle, and the operating mechanism is switched to the opened state.

Preferably, the mechanism bracket comprises a seventh shaft avoidance groove, and a shape of the seventh shaft avoidance groove matches a movement trajectory of the seventh shaft.

A circuit breaker, comprising the operating mechanism.

According to the operating mechanism of the circuit breaker of the present invention, the second connecting rod assembly realizes a variety of connection modes between the operating mechanism and the moving contact mechanism, so that the position relationship between the operating mechanism and the moving contact mechanism may be set according to actual needs. Therefore, the operating mechanism can be applied to more working scenarios, and also can make full use of a space of the circuit breaker, making the overall structure of the circuit breaker more compact.

In addition, in the operating mechanism, the first crank, the first connecting rod, the sliding rails and the sliding block form a crank-sliding block mechanism, so that the operating mechanism can achieve closing, disconnecting and tripping operations without connecting with the moving contact mechanism, which is convenient for the detection and modular production of the operating mechanism, thereby avoiding the loss of the moving contact caused by the detection of the operating mechanism. Moreover, by means of the crank-sliding block mechanism, the jump buckle can achieve a larger opening distance just by rotating to a smaller angle, and the spring force of the mechanism is reduced due to the existence of the sliding block, thereby reducing a required handle operating force and making the disconnecting and closing operations of the circuit breaker easier.

In addition, the sliding rails are disposed on a bracket side plate of the mechanism bracket, so that the operating mechanism becomes an independent operating mechanism, which is conducive to the modular assembly and production of the operating mechanism, and makes the distribution of the operating mechanism in the circuit breaker housing have more design space.

The circuit breaker of the present invention includes the operating mechanism, which can flexibly adjust a position relationship between the operating mechanism and the moving contact mechanism as needed.

DETAILED DESCRIPTIONS OF THE PREFERRED EMBODIMENTS

The specific implementation of a circuit breaker of the present invention will be further described below with reference to the embodiments given in FIGS. 1 to 15. The circuit breaker of the present invention is not limited to the description of the following embodiments.

As shown in FIGS. 4-8, 10-12, and 15, the circuit breaker of the present invention includes an operating mechanism 100 and at least one circuit breaker pole 300. Each circuit breaker pole 300 includes a contact system. The contact system includes a moving contact mechanism 1*c* and a static contact 18 which are used cooperatively. The operating mechanism 100 is in driving connection to the moving contact mechanism 1*c* to drive the moving contact mechanism 1*c* to rotate, so that the moving contact mechanism 1*c* and the static contact 18 are closed or opened.

Figure 7:
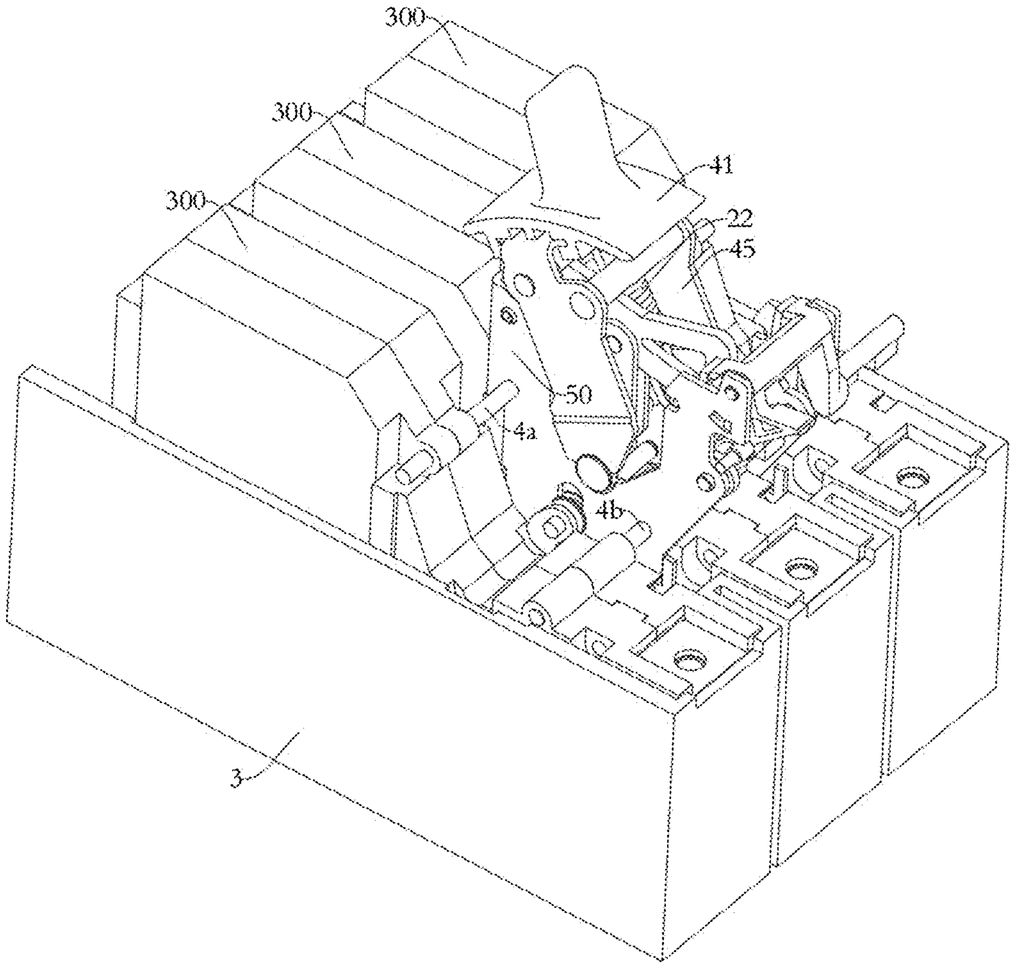
FIG. 7 is a schematic structural diagram of the circuit breaker of the present invention, in which at least an assembly relationship between the operating mechanism and a circuit breaker pole is shown.

As shown in FIG. 7, the circuit breaker of the present invention is preferably a multi-pole circuit breaker, which includes a plurality of circuit breaker poles 300 arranged side by side, wherein the moving contact mechanisms in the respective circuit breaker poles 300 are linked. Further, the circuit breaker of the present invention further includes a circuit breaker housing, which at least has the following two implementations.

In the first implementation, each of the circuit breaker poles 300 includes a unit housing 120, and the contact system is disposed within the unit housing 120; the circuit breaker of the present invention further includes a circuit breaker housing 3, and a plurality of unit housings 120 are arranged side by side in the circuit breaker housing 3: and the operating mechanism 100 is disposed to span over one of the circuit breaker poles 300.

In the second implementation, the circuit breaker of the present invention further includes a circuit breaker housing 3, wherein each circuit breaker pole 300 is not provided with a separate housing, but an insulating partition is provided between adjacent circuit breaker poles 300; and the insulating partition separates an internal space of the circuit breaker housing 3 into a plurality of mounting cavities for the circuit breaker poles 300 to be disposed.

The circuit breaker of the present invention preferably adopts a circuit breaker housing in the first implementation.

Specifically, as shown in FIG. 7, the circuit breaker of the present invention is a three-phase circuit breaker, including three circuit breaker poles 300 (respectively used for connecting or breaking a three-phase circuit of a power supply) arranged side by side: the operating mechanism 100 is mounted on the circuit breaker pole 300 located in the middle; and the moving contact mechanisms of the three circuit breaker poles 300 are linked (the moving contact mechanisms 1*c* of the three circuit breaker poles 300 are linked by an eighth shaft 5 or a ninth shaft 6). Of course, the number of the circuit breaker poles 300 can be adjusted according to actual needs. For example, the number of the circuit breaker poles 300 may be 2, which are matched with a two-phase power supply: or, the number of the circuit breaker poles 300 may also be 4, which are used for a three-phase four-wire circuit: or, the number of the circuit breaker pole 300 may also be 1, which is matched with a single-phase circuit.

Preferably, as shown in FIG. 7, the operating mechanism 100 is connected to the unit housing 120 of each circuit breaker pole 300 via a first connecting shaft 4*a* and a second connecting shaft 4*b*, respectively, and the first connecting shaft 4*a* and the second connecting shaft 4*b* are spaced in parallel.

As shown in FIGS. 1 to 15, the operating mechanism 100 includes a mechanism bracket 50, a jump buckle 60, a lock buckle 13, a rocker arm assembly, an energy storage spring 22, a first crank 30, and a first connecting rod assembly, wherein the jump buckle 60, the lock buckle 13 and the rocker arm assembly are pivotally disposed on the mechanism bracket 50) respectively: the lock buckle 13 is in locking fit with the jump buckle 60; one end of the first crank 30) is rotatably connected to the jump buckle 60, and the other end of the first crank 30 is rotatably connected to the first connecting rod assembly through a fifth shaft 16; one end of the energy storage spring 22 is connected to the fifth shaft 16, and the other end of the energy storage spring 22 is rotatably connected to the rocker arm assembly: the operating mechanism further includes a second connecting rod assembly: the second connecting rod assembly includes a second crank 19 pivotally disposed around a tenth axis 111*s*, a third connecting rod 35, and a third crank 36 pivotally disposed around an eleventh axis 119*s*: the second crank 19 is also rotatably connected to the third connecting rod 35 through an eighth shaft 5; the third connecting rod 35 is also rotatably connected to the third crank 36 through a ninth axis 6; the first connecting rod assembly is also rotatably connected to the second crank 19 through a seventh shaft 21: the tenth axis Ills, an axis of the eighth shaft 5, an axis of the ninth shaft 6 and the eleventh axis 119*s* are spaced in parallel: an axis of the seventh shaft 21 and the tenth axis 111*s* are spaced in parallel: the tenth axis 111*s* coincides with a rotation axis of the moving contact mechanism 1*c* of the circuit breaker, and the eighth shaft 5 is in driving connection to the moving contact mechanism 1*c* to drive the moving contact mechanism 1*c* to rotate: or the eleventh axis 119*s* coincides with the rotation axis of the moving contact mechanism 1*c*, and the ninth shaft 6 is in driving connection to the moving contact mechanism 1*c* to drive the moving contact mechanism 1*c* to rotate.

According to the operating mechanism of the circuit breaker of the present invention, the second connecting rod assembly realizes a variety of connection modes between the operating mechanism and the moving contact mechanism, so that the position relationship between the operating mechanism and the moving contact mechanism may be set according to actual needs. Therefore, the operating mechanism can be applied to more working scenarios, and also can make full use of a space of the circuit breaker, making the overall structure of the circuit breaker more compact.

Specifically, as shown in FIGS. 1 to 14, the tenth axis 111*s* coincides with the rotation axis of the moving contact mechanism 1*c* of the circuit breaker, and the eighth shaft 5 is in driving connection to the moving contact mechanism 1*c* to drive the moving contact mechanism 1*c* to rotate. As shown in FIG. 15, the eleventh axis 119*s* coincides with the rotation axis of the moving contact mechanism 1*c*, and the ninth shaft 6 is in driving connection to the moving contact mechanism 1*c* to drive the moving contact mechanism 1*c* to rotate.

An embodiment of the second connecting rod assembly is shown in FIGS. 1 to 15: the rotation axis of the moving contact mechanism 1*c* may be connected to a different position as needed: one end of the second crank 19 is pivotally disposed around the tenth axis Ills on the mechanism bracket 50, and the other end of the second crank 19 is rotatably connected to one end of the third connecting rod 35 through the eighth axis 5: the seventh shaft 21 is located between both ends of the second crank 19; the other end of the third connecting rod 35 is rotatably connected to one end of the third crank 36 through the ninth shaft 6; and the other end of the third crank 36 is pivotally disposed around the eleventh axis 119*s* on the mechanism bracket 50. It should be pointed out that the connection between the first connecting rod assembly and the second crank 19 does not need to coincide with the tenth axis 111*s*.

Another embodiment of the second connecting rod assembly differs from the above embodiment in that: the second crank 19 is pivotally disposed around the tenth axis Ills on the circuit breaker housing, and the third crank 36 is pivotally disposed around the eleventh axis 119*s* on the circuit breaker housing. Specifically, the second crank 19 is pivotally disposed around the tenth axis 111*s* on the unit housing 120 or the insulating partition, and the third crank 36 is pivotally disposed around the eleventh axis 120 on the unit housing 120 or the insulating partition: and the unit housing 120 or the insulating partition is provided with blind holes for cooperating with the tenth axis 111 and the eleventh axis 119.

Preferably: as shown in FIGS. 1 to 15, the tenth axis Ills, the axis of the eighth shaft 5, the axis of the ninth shaft 6 and the eleventh axis 119*s* are located at four vertices of a parallelogram, respectively. In the action process of the second connecting rod assembly, the second crank 19 and the third crank 36 are always kept in parallel. A connecting line between the third connecting rod 35 and the tenth axis Ills and a connecting line between the third connecting rod 35 and the eleventh axis 119*s* are always kept in parallel. The eighth shaft 5 and the ninth shaft 6 have the same movement trajectory (they do not coincide).

Figure 9:
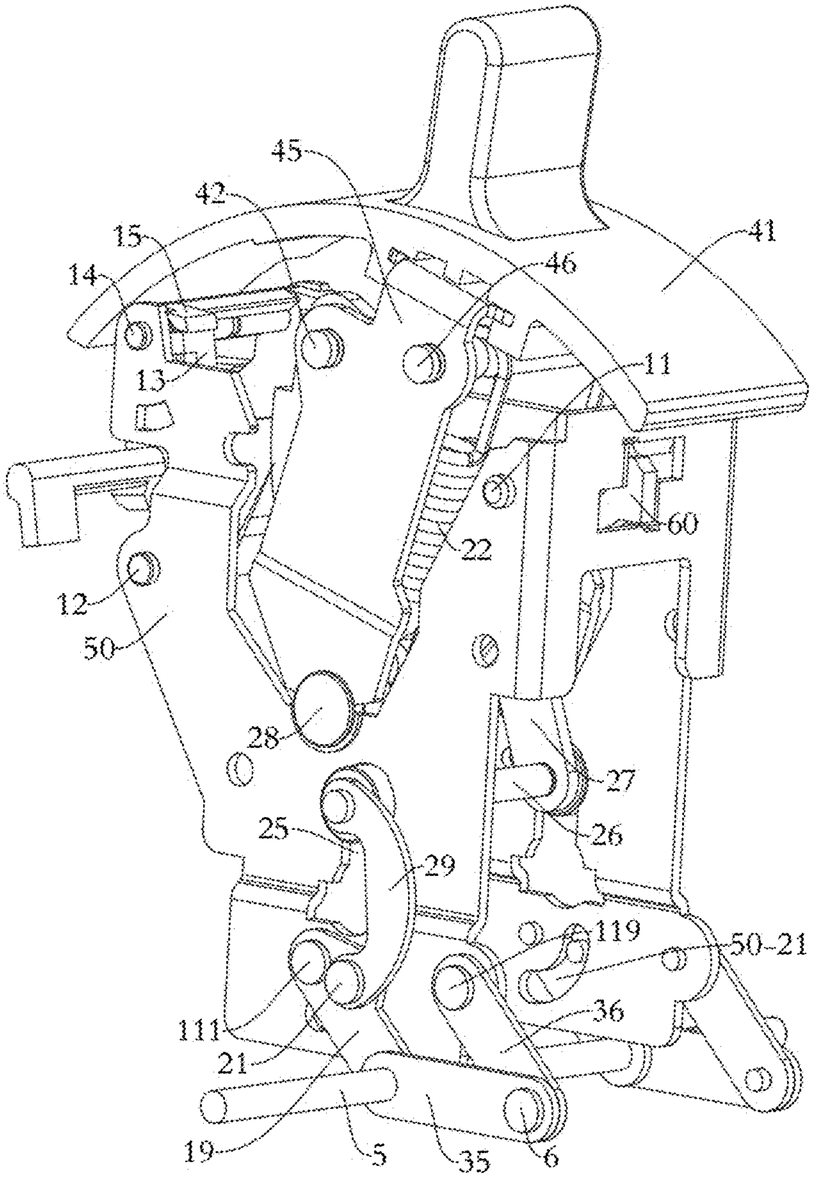
FIG. 9 is a schematic structural diagram of the operating mechanism of the present invention.

As shown in FIG. 9 and FIG. 15, two sets of second connecting rod assemblies may be symmetrically disposed at least according to the following two implementations.

In the first implementation, as shown in FIG. 9, the mechanism bracket 50 includes two bracket side plates disposed oppositely: wherein the two bracket side plates are respectively located on both sides of a unit housing 120, and two sets of second connecting rod assemblies are disposed on both sides of the two bracket side plates, respectively. The two second cranks 19 are rotatably connected to the first connecting rod assembly via two seventh shafts 21 respectively, each bracket side plate is provided with a seventh shaft avoidance groove 50-21 for avoiding the seventh shaft 21, and the shape of the seventh shaft avoidance groove 50-21 matches a movement trajectory of the seventh shaft 21. A rotation axis of the moving contact mechanism 1*c* coincides with the tenth axis Ills, the two third connecting rods 35 are rotatably connected to the two second cranks 19 through an eighth shaft 5 respectively, and the eighth shaft 5 passes through the contact support 110 of the moving contact mechanism 1*c* to drive the moving contact mechanism 1*c* to rotate. The two third connecting rods 35 are rotatably connected to two third cranks 36 through two ninth shafts 6 respectively. The two third cranks 36 are pivotally disposed on the two bracket side plates respectively through two eleventh shafts 119. The unit housing 120 is provided with a unit housing avoidance groove 120-5 for avoiding the eighth shaft 5, and the shape of the unit housing avoidance groove 120-5 matches a movement trajectory of the eighth shaft 5.

As shown in FIG. 15, the second implementation differs from the first implementation in that: the rotation axis of the moving contact mechanism 1*c* coincides with the eleventh axis 119*s*, and the two third connecting rods 35 are rotatably connected to the two second cranks 19 through two eighth shafts 5, respectively: the two third connecting rods 35 are rotatably connected to the two third cranks 36 through a ninth shaft 6 respectively, and the ninth shaft 6 passes through the contact support 110 of the moving contact mechanism 1*c* to drive the moving contact mechanism 1*c* to rotate: and the unit housing 120 is provided with a unit housing avoidance groove 120-5 for avoiding the ninth shaft 6, and the shape of the unit housing avoidance groove 120-5 matches a movement trajectory of the ninth shaft 6.

Of course, in the first and second implementations, if the circuit breaker pole 300 is not provided with the unit housing 120, but an insulating partition is provided between the adjacent circuit breaker poles 300, the insulating partition is provided with an insulating partition avoidance groove for avoiding the eighth shaft 5 or ninth shaft 6, and the shape of the insulating partition avoidance groove matches the movement trajectory of the eighth shaft 5 or the ninth shaft 6.

As shown in FIGS. 1 to 6, the first connecting rod assembly includes a first connecting rod 27, a sliding block 26 and a second connecting rod 29; the operating mechanism 100 further includes sliding rails 25: the first crank 30 is rotatably connected to one end of the first connecting rod 27 through a fifth shaft 16, and the other end of the first connecting rod 27 is rotatably connected to the sliding block 26: the sliding block 26 is also rotatably connected to one end of the second connecting rod 29, and the other end of the second connecting rod 29 is rotatably connected to the second crank 19 through the seventh shaft 21; and the sliding block 26 is slidably disposed in the sliding rails 25. When the operating mechanism 100 is in an opened state or a tripped state, the sliding block 26 is in limiting fit with the sliding rails 25 to prevent the sliding block 26 from slipping, so that the operating mechanism 100 can be stabilized in the opened state or the tripped state without the cooperation of the moving contact mechanism 1*c*. In the operating mechanism 100, the first crank 30, the first connecting rod 27, the sliding rails 25 and the sliding block 26 form a crank-sliding block mechanism, so that the operating mechanism 100 can achieve closing, disconnecting and tripping operations without connecting with the moving contact mechanism 1*c*, which is convenient for the detection and modular production of the operating mechanism 100, thereby avoiding the need for the installation of the moving contact mechanism during the detection of the operating mechanism 100, and also avoiding the loss of the moving contact.

Preferably, in the case that the sliding rails 25 are of a groove-like structure, the sliding rails 25 may be disposed on the inner side wall of the bracket 50 or the inner side wall of the unit housing 120 (an insulating partition is disposed between adjacent circuit breaker poles 300 in the case that the circuit breaker pole 300 is not provided with the unit housing 120, and the sliding rails 25 are disposed on a side wall of the insulating partition), and the sliding rails 25 do not penetrate through the bracket 50 or the unit housing 120 (or the insulating partition) in a thickness or depth direction. Further, two ends of the sliding block 26 are respectively disposed in the two sliding rails 25, and one end of the first connecting rod 27 connected to the sliding block 26 and one end of the second connecting rod 29 connected to the sliding block 26 are both disposed in a space between the two sliding rails 25.

Preferably, in the case that the sliding rails 25 are of a hole-like structure, the sliding rails 25 may be disposed on the inner side wall (as shown in FIGS. 1-6, 10-12, and 15) of the bracket 50 or the inner side wall of the unit housing 120 (the insulating partition is disposed between adjacent circuit breaker poles 300 in the case that the circuit breaker pole 300 is not provided with the unit housing 120, and the sliding rails 25 are disposed on a side wall of the insulating partition), and the sliding rails 25 do not penetrate through the bracket 50 or the unit housing 120 (or the insulating partition) in a thickness or depth direction. Further, as shown in FIG. 9, two ends of the sliding block 26 pass through the two sliding rails 25 respectively: one end of the first connecting rod 27, which is connected to the sliding block 26, is located between the two sliding rails 25: and one ends of the two second connecting rods 29, which are connected to the sliding block 26, are located on two sides of the two sliding rails 25 respectively, and rotatably connected to two ends of the sliding block 26 respectively.

Preferably, each sliding rail 25 is in a shape of a straight line, an arc shape, a triangular shape, or a combined shape of straight line and arc. Further, the shape of the sliding rails 25 may also be adaptively set according to a current level of the circuit breaker, a design space, control requirements, and the like. As shown in FIGS. 1 to 6, the sliding block 26 moves upward along the sliding rails 25 in response to a disconnecting or tripping action of the circuit breaker (or the operating mechanism 100): and the sliding block 26 moves downward along the sliding rails 25 when the circuit breaker is closed. A trajectory of upward movement and a trajectory of downward movement are coincident, which, in this case, may be set in a straight line, an arc shape, or a combined shape of straight line and arc. For example, the sliding rails 25 are set in a triangular shape or other shapes. In the case that the sliding rails 25 is set in a triangular shape, a movement trajectory of the sliding block 26 along the sliding rails 25 is upward along one side of the triangle when the circuit breaker is opened or tripped: the movement trajectory of the sliding block 26 along the sliding rails 25 is downward along another side of the triangle, but the downward and upward movement trajectories are not coincident (not shown); and the sliding block 26 forms a closed-shaped movement trajectory along the sliding rails 25 in response to the state switching of the operating mechanism.

An embodiment of the sliding rails 25 and the sliding block 26 is shown in FIG. 9: the mechanism bracket 50 includes two bracket side plates spaced oppositely, and each bracket side plate is provided with the sliding rails 25, and two ends of the sliding block 26 are slidably disposed on the two sliding rails 25 respectively. Further, as shown in FIG. 9, each sliding rail 25 is a sliding hole, and the sliding block 26 is a sliding shaft, two ends of which are respectively disposed in the two sliding holes. Further, as shown in FIGS. 9 to 12, the sliding rail 25 is a straight hole. The sliding block 26 includes a sliding shaft and track blocks, with one track block being disposed on each of both ends of the sliding shaft: and each track block is disposed in one sliding rail 25 and is in sliding and limiting fit therewith. The sliding rails 25 are disposed on the bracket side plate of the mechanism bracket 50, so that the operating mechanism 100 becomes an independent operating mechanism, which is conducive to the modular assembly and production of the operating mechanism 100, and makes the distribution of the operating mechanism 100 in the circuit breaker housing 3 have more design space.

As shown in FIGS. 1-6, 10-12, and 15, the operating mechanism 100 further includes a re-buckle 15 pivotally disposed on the mechanism bracket 50, the re-buckle 15 being in limiting fit with the lock buckle 13. Further, the circuit breaker of the present invention further includes an overload and short-circuit protection mechanism. The overload and short-circuit protection mechanism will drive the re-buckle 15 to rotate while a short-circuit or overload fault occurs in the circuit breaker, so that the re-buckle 15 releases the limiting fit from the lock buckle 13. Further, the short-circuit and overload protection mechanism includes a short-circuit protection mechanism and an overload protection mechanism, wherein the short-circuit protection mechanism is preferably an electromagnetic trip, and the overload protection mechanism is preferably a thermal tripping mechanism (e.g., the overload protection mechanism includes a bimetal sheet). It should be pointed out that the cooperation between the lock buckle 13 and the jump buckle 60, the cooperation between the lock buckle 13 and the re-buckle 15, and the cooperation between the re-buckle 15 and the short-circuit and overload protection mechanism may all be realized by the prior art, which will not be expanded in detail.

Figure 8:
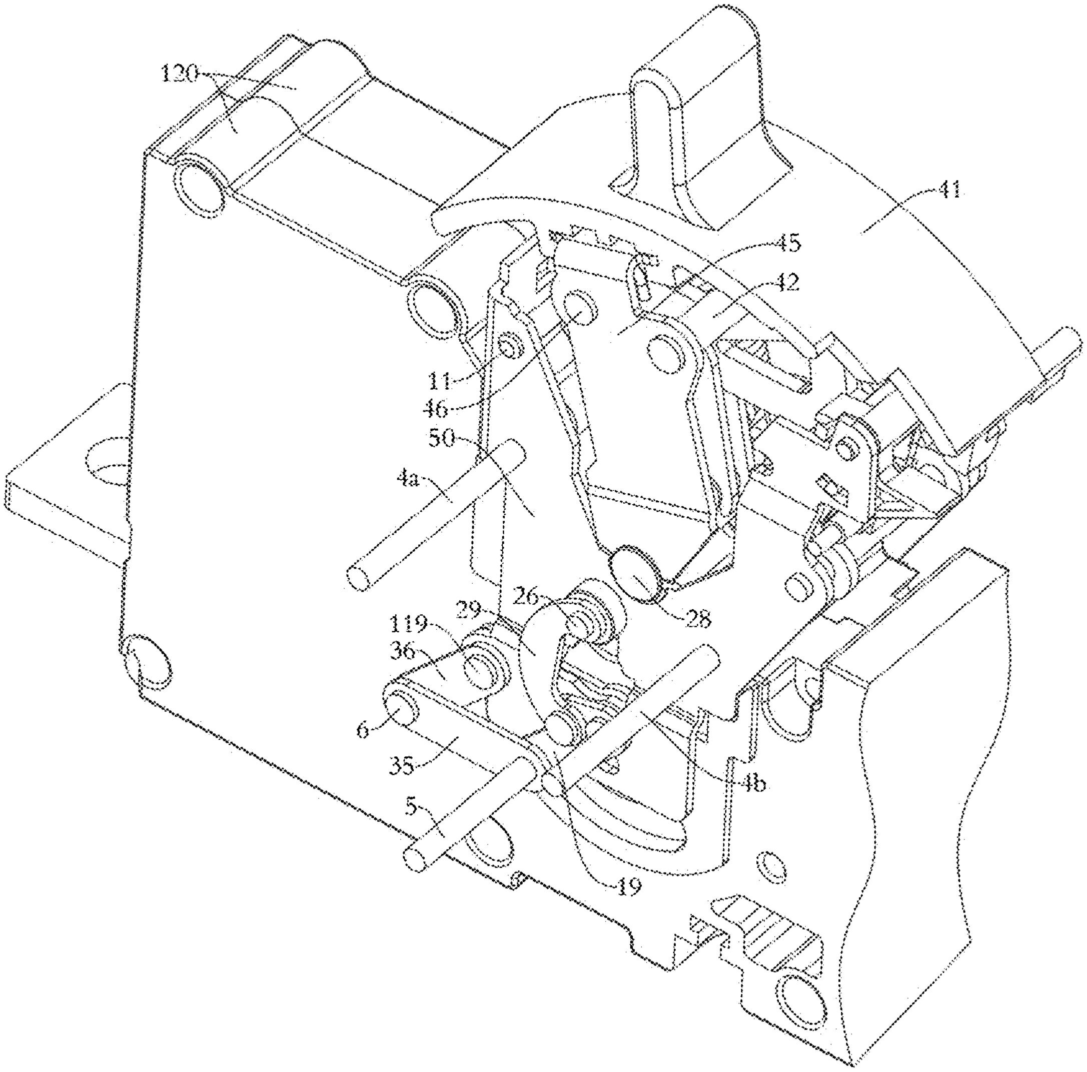
FIG. 8 is a schematic diagram of an assembly stereostructure of the operating mechanism and the circuit breaker pole of the present invention.

An embodiment of the rock arm assembly is shown in FIGS. 8 and 9: the rocker arm assembly includes a synchronously acting handle 41, a rocker arm 45 fixedly connected to the handle 41, and a reset structure 42 for driving the jump buckle 60 to rotate to re-lock with the lock buckle 13, wherein the rocker arm 45 is pivotally disposed on the mechanism bracket 50, and two ends of a swing stroke of the rocker arm 45 on the rocker arm assembly are in limiting fit with the mechanism bracket 50, respectively. Further, as shown in FIGS. 8 and 9, the reset structure 42 is a reset shaft: the jump buckle 60 is of a strip structure, wherein one end of the jump buckle 60 is in locking fit with the lock buckle 13, and the other end of the jump buckle 60 is pivotally disposed on the mechanism bracket 50 (preferably, pivotally disposed on the mechanism bracket 50 through a first shaft 11); and the jump buckle 60 includes a driving side edge disposed on one edge thereof to be in driving fit with the reset structure 42.

As shown in FIGS. 1-6, and 9, one end of the energy storage spring 22 is connected to the fifth shaft 16, and the other end of the energy storage spring 23 is rotatably connected to a rocker arm 45 of the rocker arm assembly through a fourth shaft 46.

An embodiment of the first crank 30 is shown in FIGS. 1-6: the first crank 30 is of a triangular structure, in which one vertex is rotatably connected to the re-buckle 60 through a sixth shaft 67, the second vertex is rotatably connected to one end of the first spring 22 and the first connecting rod 27 through the fifth shaft 16 respectively, and the third vertex is provided with a crank limiting portion 31. Further, the two first cranks 30 are respectively disposed on two sides of the jump buckle 60, and the three vertices of the two first cranks 30 are connected to the crank limiting portion 31 respectively through the sixth shaft 67 and the fifth shaft 16.

As shown in FIGS. 10-12, and 15, the mechanism bracket 50 includes a V-shaped groove, wherein the rocker arm 45 is in limiting fit with two side walls of the V-shaped groove at the first stroke end and the second stroke end, respectively. Further, as shown in FIG. 9, the mechanism bracket 50) includes a bracket side plate and a bracket connecting plate that are spaced oppositely, wherein two ends of the bracket connecting plate are bendably connected to the two bracket side plates respectively, so that the mechanism bracket 50 is of a U-shaped structure as a whole, and each bracket side plate is provided with a V-shaped groove. As shown in FIGS. 1-6, the rocker arm 45 includes a pair of rocker arm legs spaced oppositely, which are respectively disposed in two V-shaped grooves and are rotatably disposed around a twelfth axis 28*s* on the two bracket side plates 28 respectively (as shown in FIG. 9, the two rocker arm legs are preferably rotatably connected to the two bracket side plates through a twelfth shaft 28).

Combined with FIGS. 1-3, 4-6, and 10-12, a process of switching the operating mechanism 100 among an opened state, a closed state and a tripped state is described below:

two ends of a swing stroke of the rocker arm assembly (the rocker arm 45) are a first stroke end and a second stroke end respectively: and two ends of the energy storage spring 22, which are connected to the rocker arm assembly and the first crank 30, are a first spring end and a second spring end, respectively. Specifically, as shown in FIGS. 1-3, 4-6, and 10-12, the first stroke end and the second stroke end of the rocker arm assembly are a right end and a left end of the swing stroke of the rocker arm assembly respectively: and the upper end and the lower end of the energy storage spring 22 are the first spring end and the second spring end, respectively.

Figure 1:
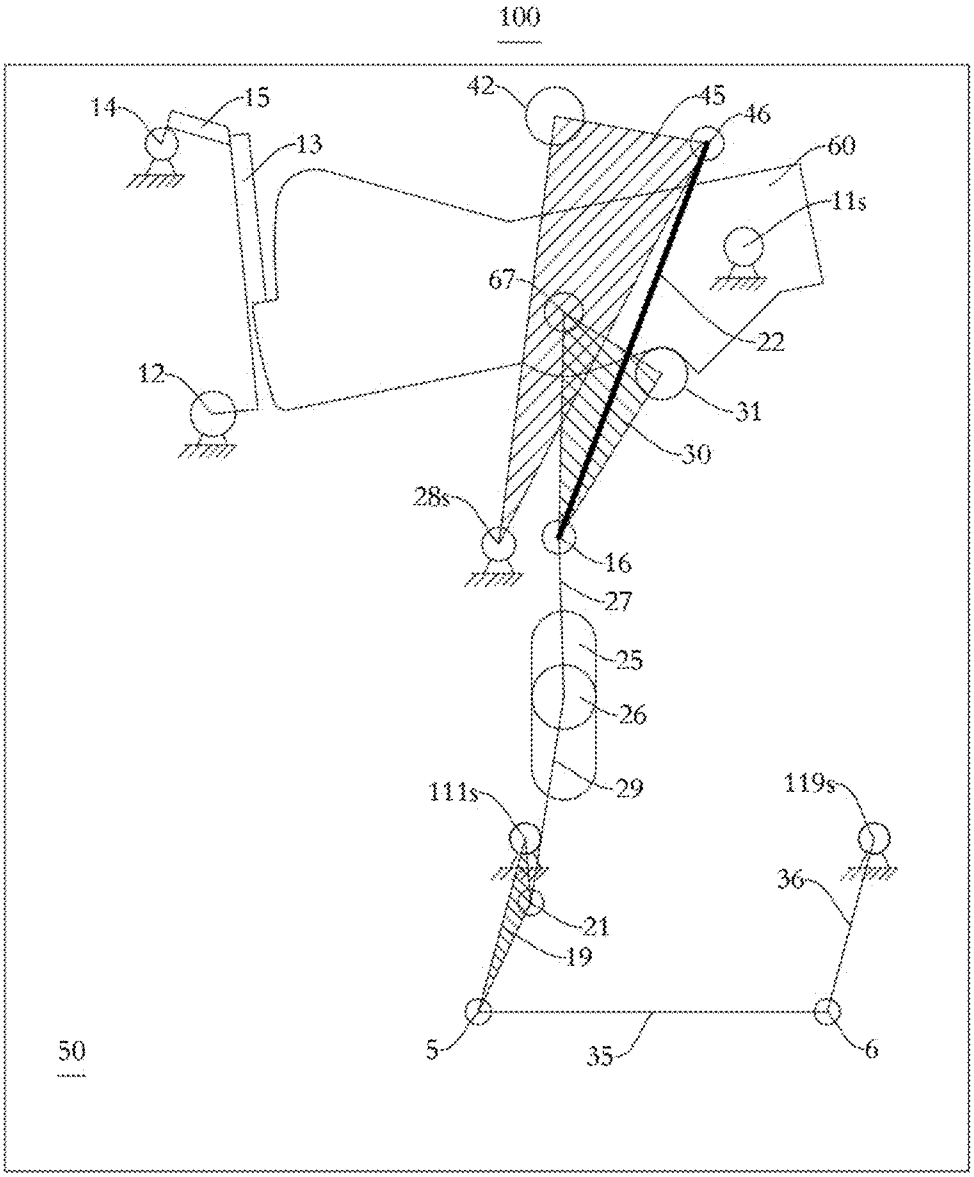
FIG. 1 is a schematic diagram of a structural principle of an operating mechanism of the present invention, in which the operating mechanism is in a closed state.
Figure 2:
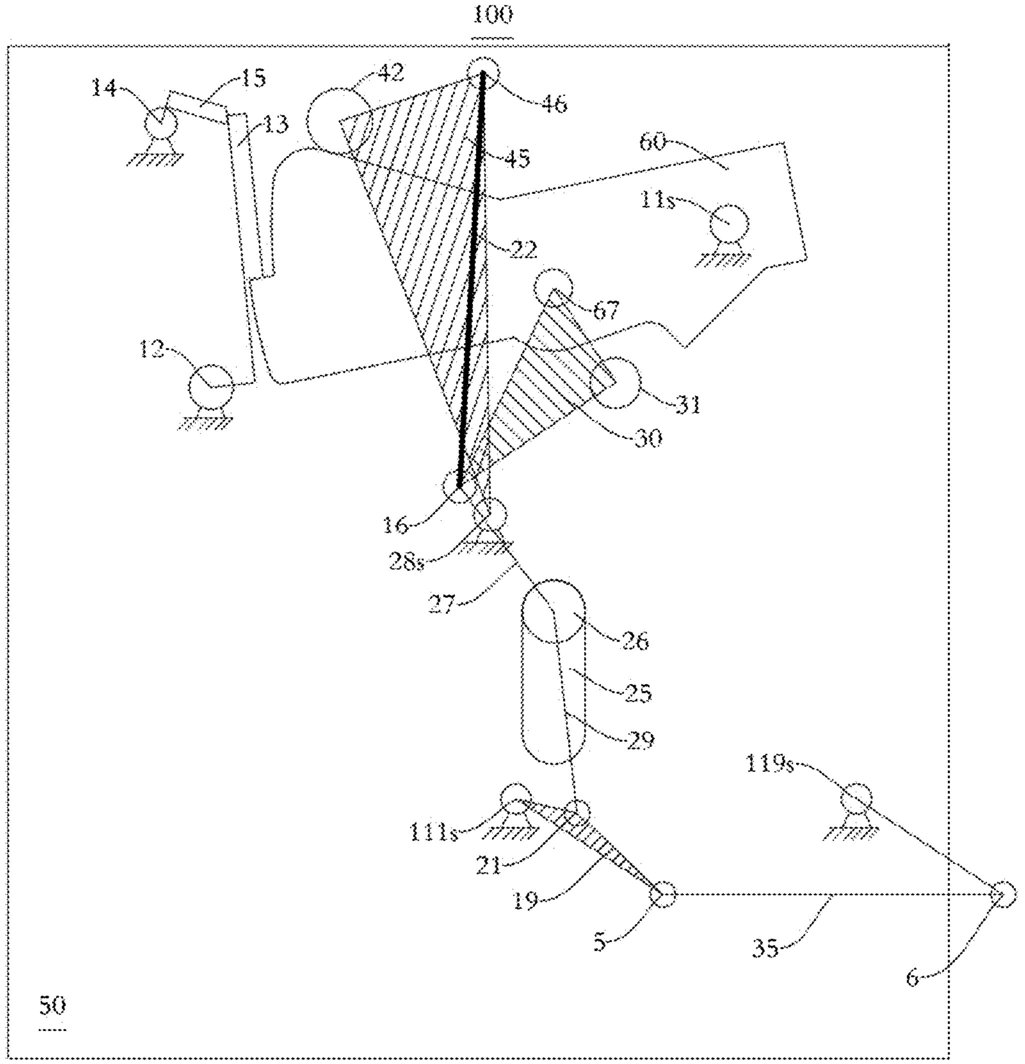
FIG. 2 is a schematic diagram of a structural principle of the operating mechanism of the present invention, in which the operating mechanism is in an opened state.
Figure 4:
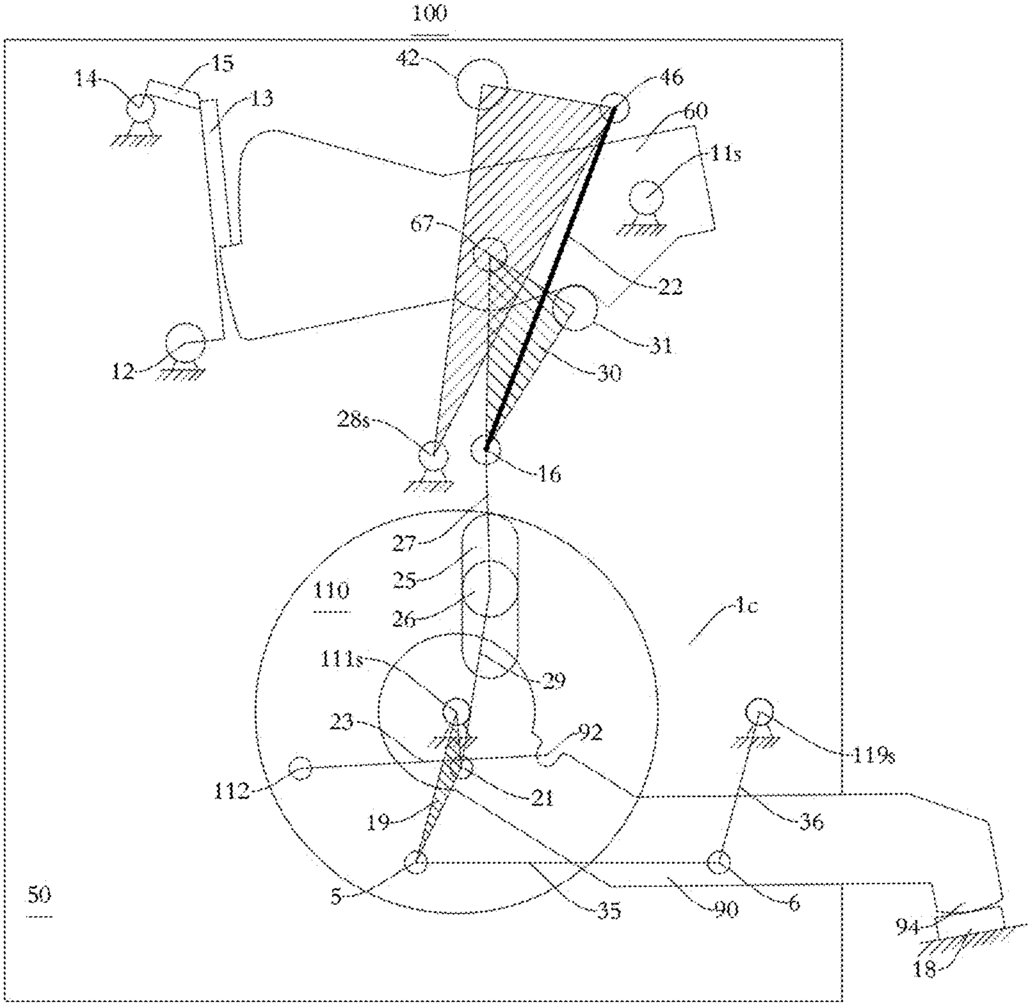
FIG. 4 is a schematic diagram of a structural principle of a circuit breaker of the present invention, in which the circuit breaker is in a closed state.
Figure 5:
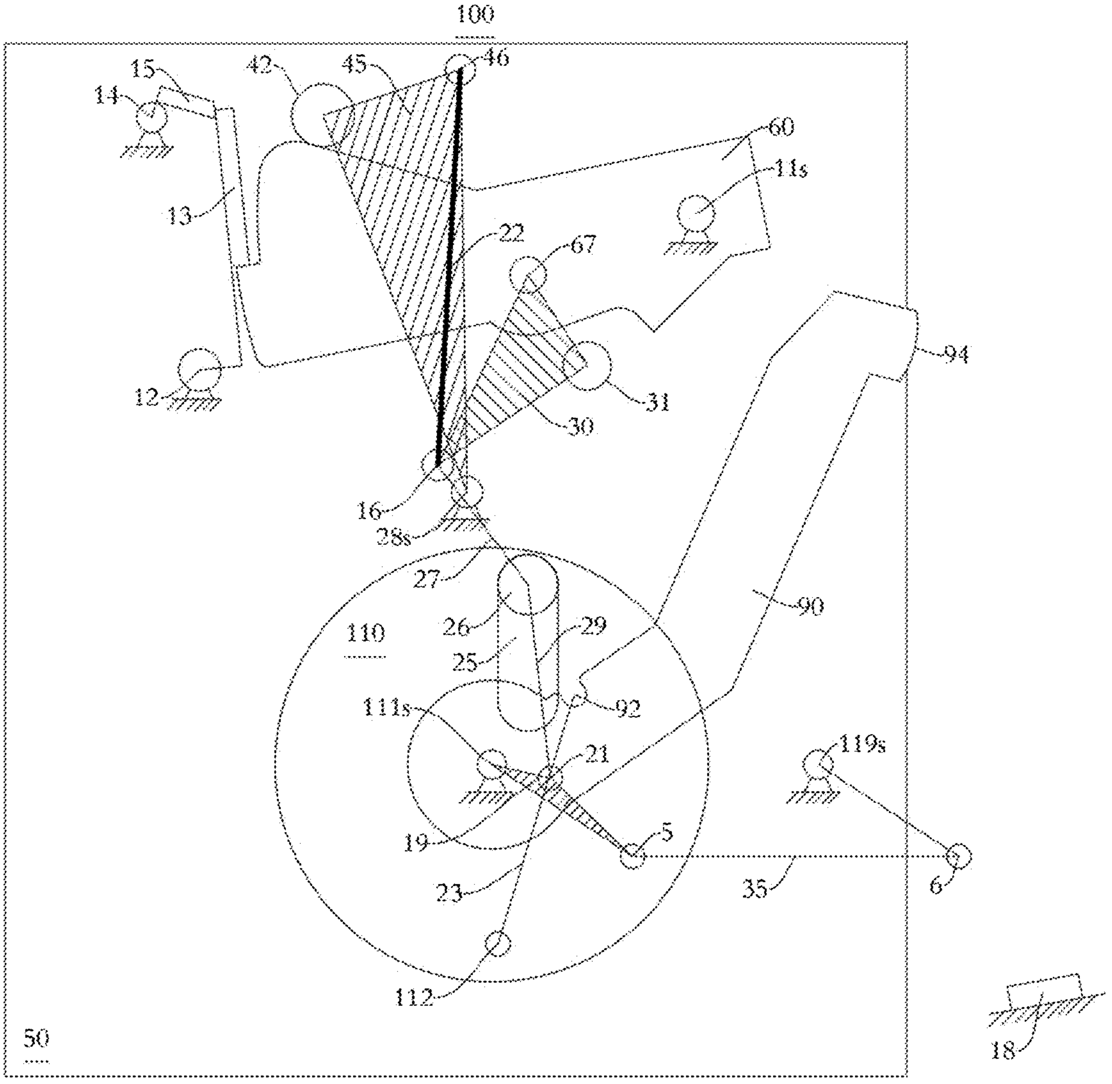
FIG. 5 is a schematic diagram of a structural principle of the circuit breaker of the present invention, in which the circuit breaker is in an opened state.
Figure 10:
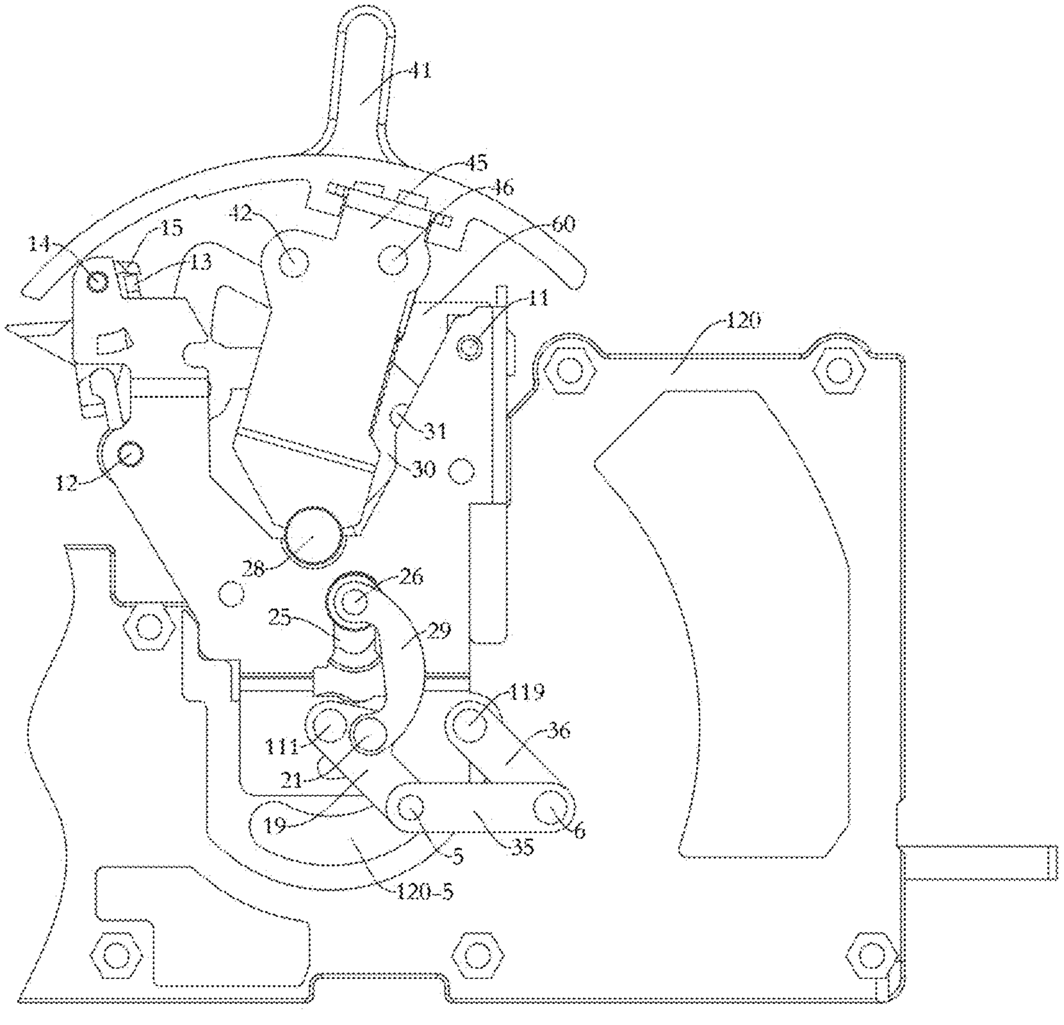
FIG. 10 is a schematic structural diagram of a side projection after the operating mechanism of the present invention and the circuit breaker pole are assembled, in which the operating mechanism is in a closed state.
Figure 11:
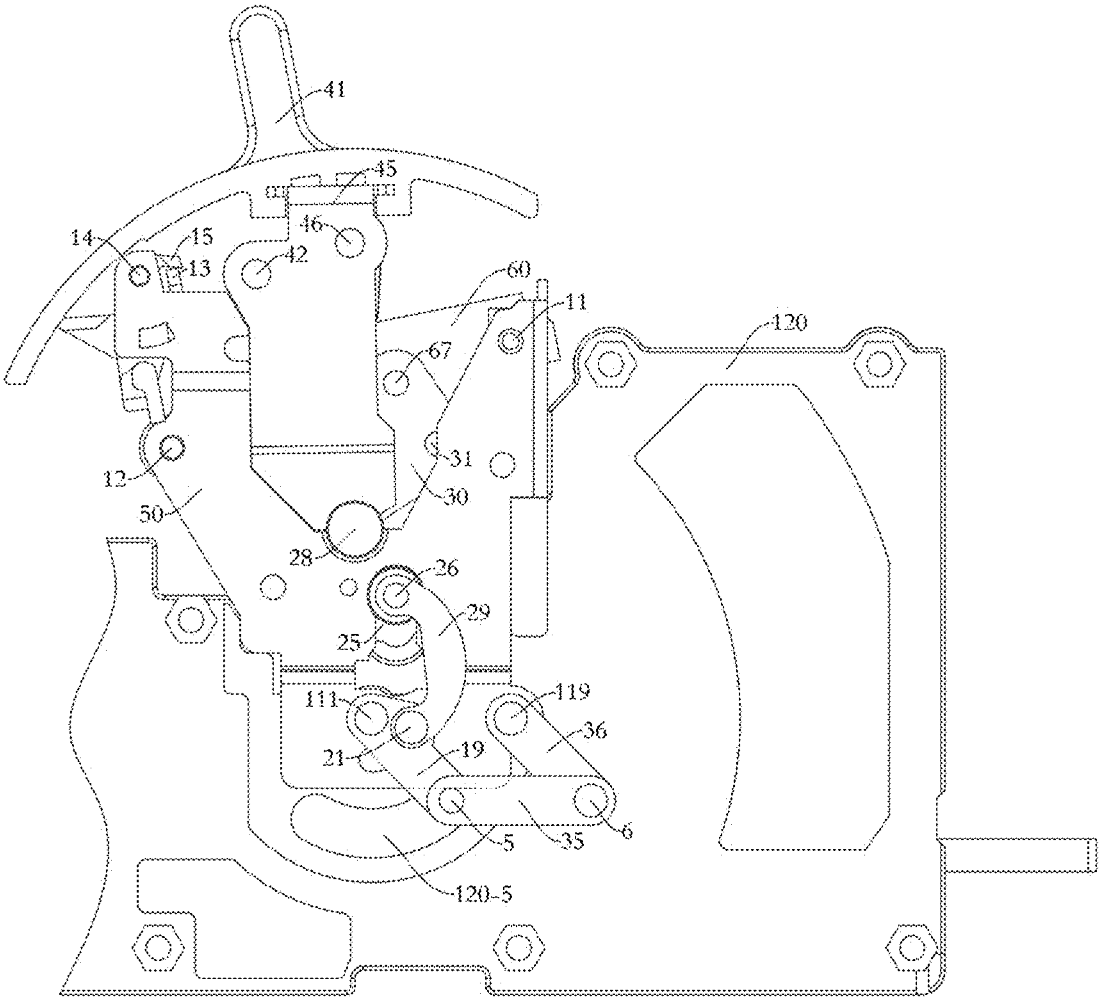
FIG. 11 is a schematic structural diagram of a side projection after the operating mechanism of the present invention and the circuit breaker pole are assembled, in which the operating mechanism is in an opened state.

As shown in FIGS. 1-2, 4-5, and 10-11, an action process of the operating mechanism 100 being switched from the closed state to the opened state will be described below: as shown in FIGS. 1, 4 and 10, in the case that the operating mechanism 100 is in the closed state, the rocker arm 45 (the rocker arm assembly) swings toward the second stroke end and drives the first spring end to rotate around the second spring end, until the energy storage spring 22 turns past a first dead center position: the energy storage spring 22 drives the first crank 30 to rotate in a second direction and drives the rocker arm 45 (the rocker arm assembly) to swing to the second stroke end: the first crank 30 drives the sliding block 26 through the first connecting rod 27 to slide along the sliding rails 125, till it is in limiting fit therewith, thereby preventing the first crank 30) from rotating in the second direction: and meanwhile the sliding block 26 drives the contact support 110 to rotate in the first direction to a breaking position through the second connecting rod 29 and the second crank 19, so that the operating mechanism is switched to an opened state shown in FIGS. 2, 5 and 11. Specifically, as shown in FIGS. 1-2, 4-5, and 10-11, in the case that the operating mechanism 100 is switched from the closed position to the opened position, the sliding block 26 moves upward along the sliding rails 25, the first direction is counterclockwise, and the second direction is clockwise. When the energy storage spring 22 is located at the first dead center position, the energy storage of the energy storage spring 122 reaches a maximum value, and an axis of the sixth shaft 67 is located on an axis of the energy storage spring 22. The energy storage spring 22 turns past the first dead center position around the second spring end, while the axis of the energy storage spring 22 turns past the axis of the sixth shaft 67. Therefore, the axis of the sixth shaft 67 may also be regarded as the first dead center position, that is to say: the axis of the energy storage spring 22 turns past the axis of the sixth shaft 67. i.e., the first spring 22 turns past the first dead center position. Then, the energy storage spring 22 releases energy to drive the first crank 30.

An action process of the operating mechanism 100 being switched from the opened state to the closed state will be described below in conjunction with FIGS. 1-2, 4-5, and 10-11: as shown in FIGS. 2, 5 and 11, in the case that the operating mechanism 100 is in the opened state, the rocker arm 45 (the rocker arm assembly) swings toward the first stroke end and drives the first spring end to rotate around the second spring end, until the energy storage spring 22 turns past the first dead center position: the energy storage spring 22 drives the first crank 30 to rotate in the first direction, such that the crank limiting portion 31 is in limiting fit with the jump buckle 60, thereby preventing the first crank 30 from rotating in the first direction: meanwhile, the energy storage spring 22 drives the rocker arm 45 (the rocker arm assembly) to swing to the first stroke end, and the first crank 30 drives the sliding block 126 through the first connecting rod 127 to slide along the sliding rails 25: the sliding block 26 drives the contact support 110 to rotate in the second direction to a closed position through the second connecting rod 29 and the second crank 19, so that the operating mechanism is switched to the closed state shown in FIGS. 1, 4 and 10; and the first direction and the second direction are opposite to each other. Specifically, as shown in FIGS. 1-2, 4-5, and 10-11, the sliding block 26 moves downward along the sliding rails 25 while the operating mechanism 100 is switched from the opened state to the closed state.

Figure 3:
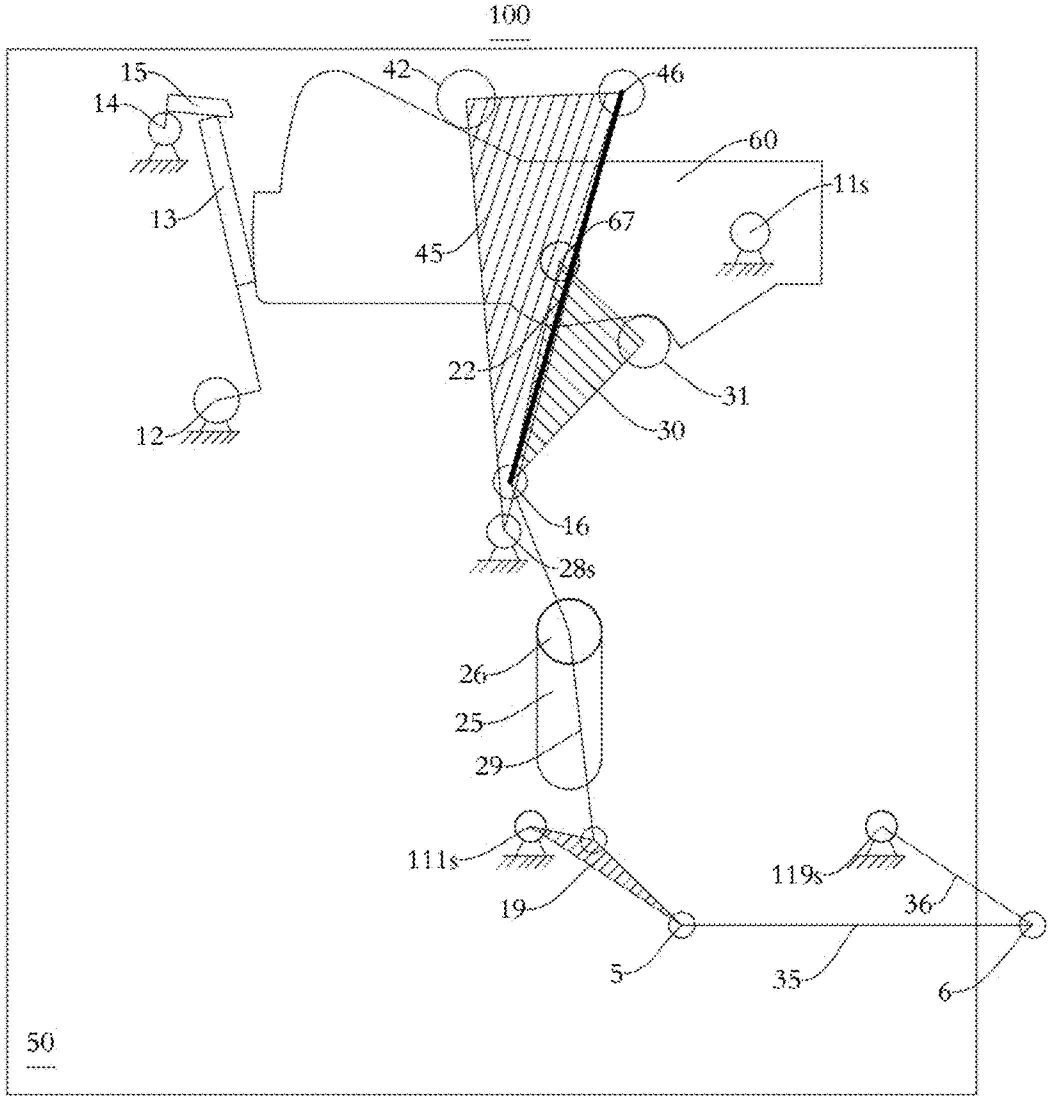
FIG. 3 is a schematic diagram of a structural principle of the operating mechanism of the present invention, in which the operating mechanism is in a tripped state.
Figure 6:
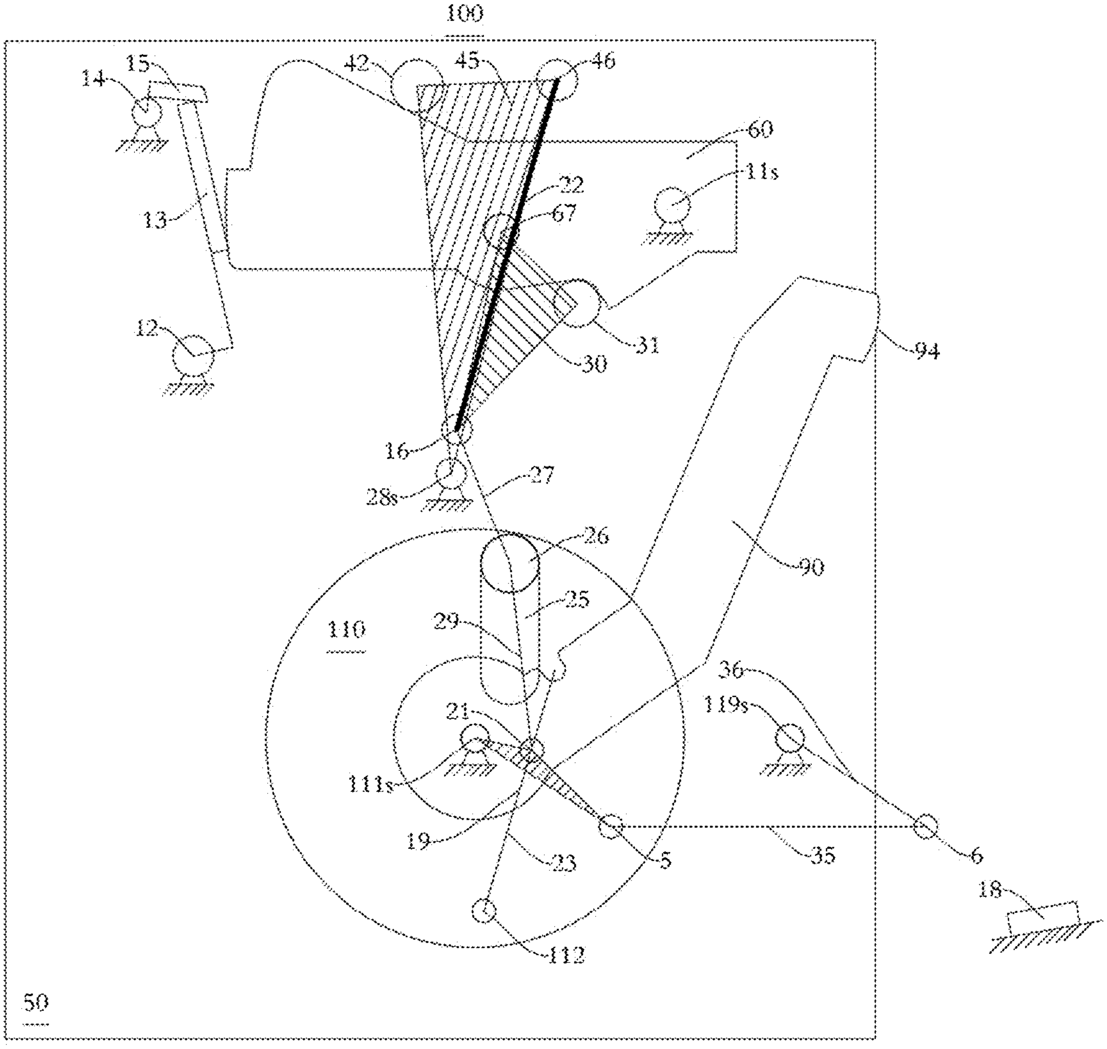
FIG. 6 is a schematic diagram of a structural principle of the circuit breaker of the present invention, in which the circuit breaker is in a tripped state.
Figure 12:
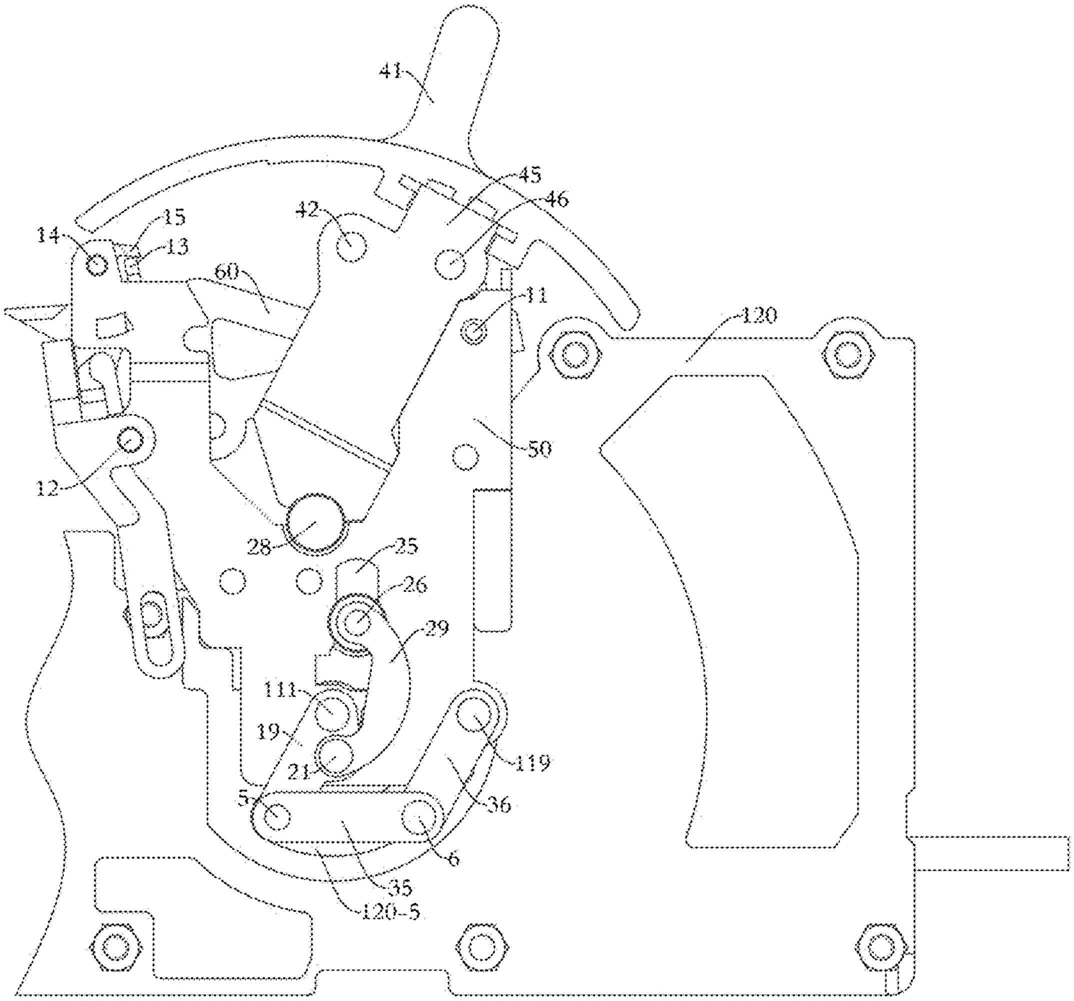
FIG. 12 is a schematic structural diagram of a side projection after the operating mechanism of the present invention and the circuit breaker pole are assembled, in which the operating mechanism is in a tripped state.

An action process of the operating mechanism 100 being switched from the closed state to the tripped state will be described below in conjunction with FIGS. 1, 3, 4, 6, 10 and 12: as shown in FIGS. 1, 4 and 10, in the case that the operating mechanism 100 is in the closed state, the re-buckle 15 is driven to rotate to release the limiting fit from the lock buckle 13 in the event of circuit fault of the circuit breaker such as overload or short-circuiting, and the lock buckle 13 rotates to release the locking fit from the jump buckle 60; the jump buckle 60 rotates and drives the first crank 30 to rotate synchronously, the first crank 30 drives the sliding block 26 through the first connecting rod 27 to slide along the sliding rails 25 to be in limiting fit with the sliding rails 25, thereby preventing the jump buckle 60) from continuing to rotate: meanwhile, the sliding block 26 drives the contact support 110 through the second connecting rod 29 and the second crank 19 to rotate in the second direction to a breaking position: and the energy storage spring 22 drives the rocker arm 45 (rocker arm assembly) to swing toward the second stroke end to the reset structure 42 to be in limiting fit with the jump buckle 60, and the operating mechanism 100 is switched to a tripped state as shown in FIGS. 3, 6, and 12. Specifically, referring to the directions shown in FIGS. 1, 3, 4, 6, 10 and 12, the sliding block 26 moves upward along the sliding rails 25 while the operating mechanism 100 is switched from the closed state to the tripped state.

An action process of the operating mechanism 100 being switched from the tripped state to the opened state will be described below in conjunction with FIGS. 2-3, 5-6, and 11-12: as shown in FIGS. 3, 6 and 12, in the case that the operating mechanism 100 is in the tripped state, the rocker arm 45 (the rocker arm assembly) swings to the second stroke end, and the rocker arm 45 (the rocker arm assembly) drives the jump buckle 60 through the reset structure 42 to rotate to be in locking fit with the lock buckle 13; and meanwhile, the lock buckle 13 rotates to be in limiting fit with the re-buckle 15, and the operating mechanism 100 is switched to the opened state shown in FIGS. 2, 5 and 11.

Figure 14:
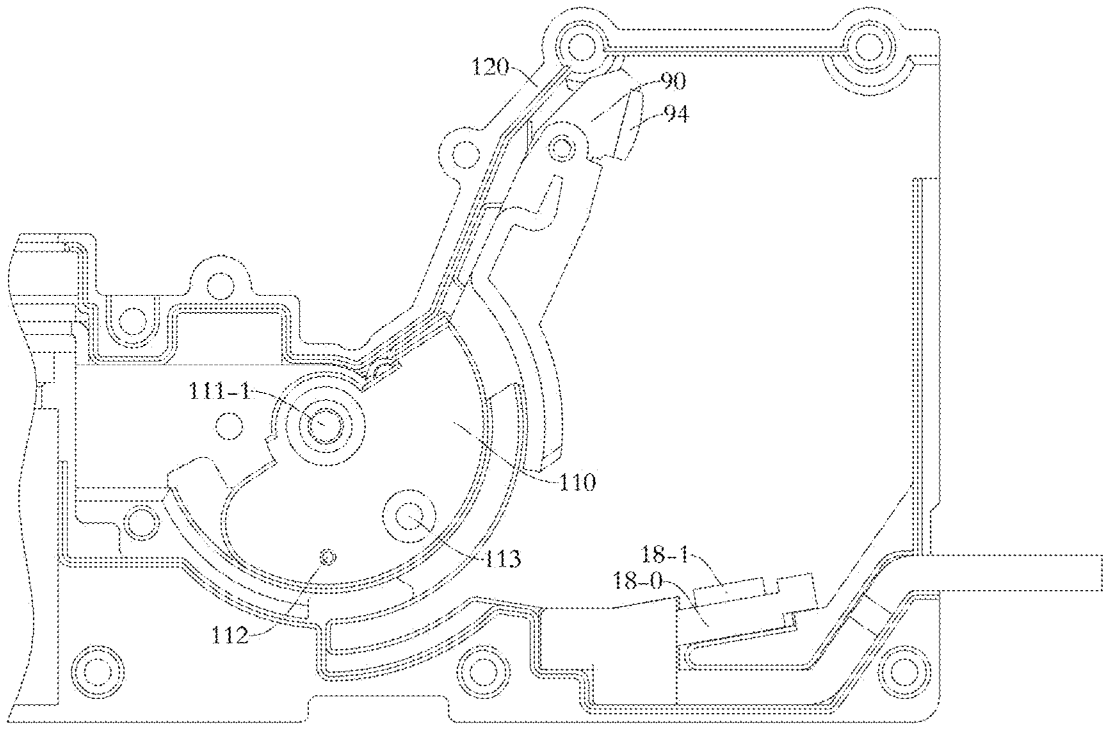
FIG. 14 is a schematic structural diagram of the circuit breaker pole of the present invention, in which the moving contact mechanism and the static contact are in an opened state.
Figure 15:
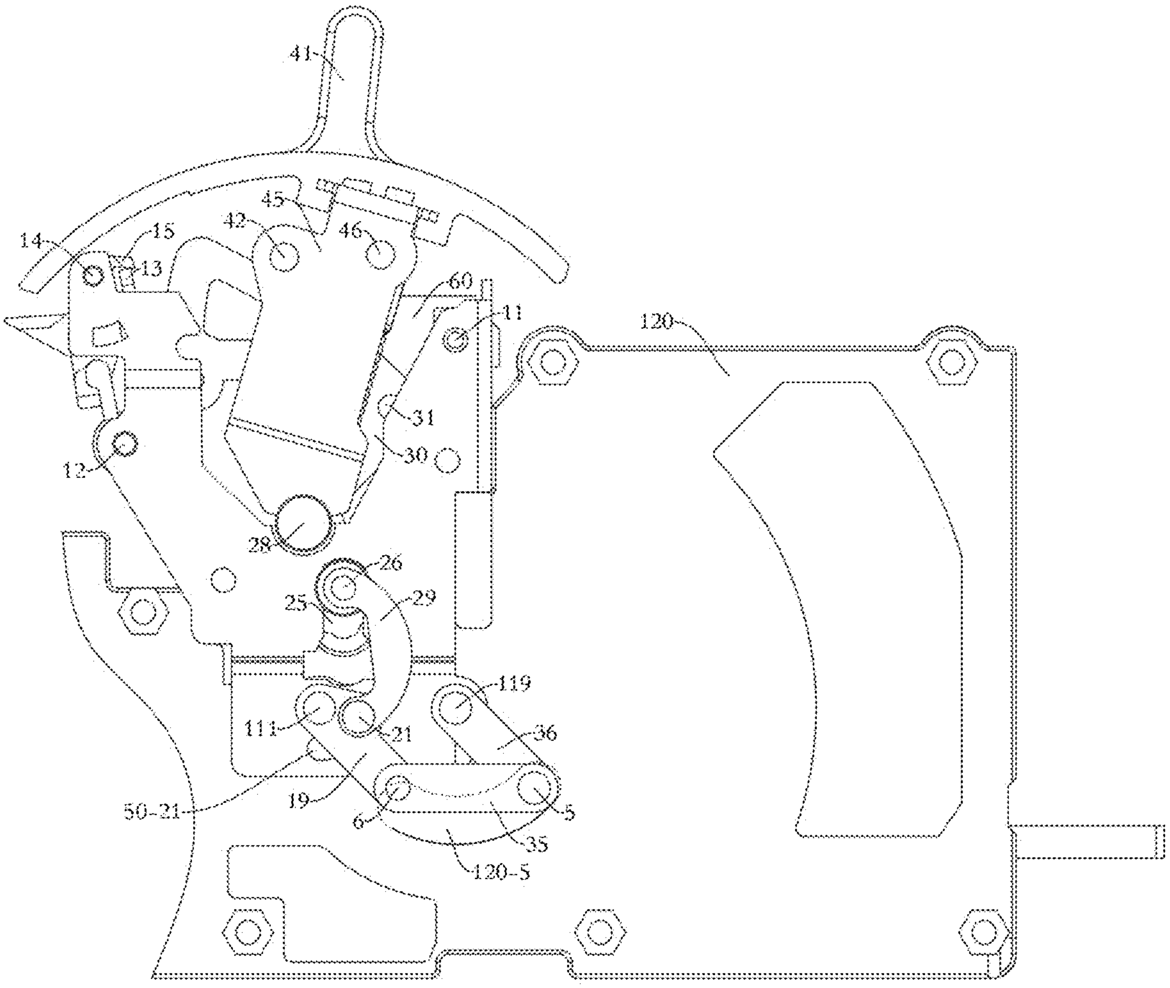
FIG. 15 is a schematic structural diagram of a side projection after the operating mechanism of the present invention and the circuit breaker pole are assembled, in which a rotation axis of the moving contact mechanism coincides with an eighth shaft.

It should be point out that, as shown in FIG. 14, when the operating mechanism 100 is in the opened state, the contact support 110 and/or the moving contact is also limited by the unit housing 120, so that the contact support 110 can no longer continue to rotate in the first direction. The contact support 110 forms limiting on the sliding block 26 through the second connecting rod 29, which will also prevent the sliding block 26 from sliding upward along the sliding rails 25. As shown in FIG. 4, in a case that the operating mechanism 100 is in the closed state, the moving contact and the static contact 18 are closed, preventing the moving contact from continuing to rotate in the second direction, while the contact support 110 will continue to rotate at a certain angle to obtain a certain overtravel, thereby ensuring a necessary pressure between the moving contact and the static contact 18. When the crank limiting portion 31 of the first crank is in limiting fit with the jump buckle 60, the contact support 110 will be limited and cannot continue to rotate. In a case that the operating mechanism 100 is in the tripped state, the contact support 110 and/or the moving contact is limited by the unit housing 120 or the shaft 5 is limited by the bracket 50, so that the contact support 110 can no longer continue to rotate in the first direction. Meanwhile, the contact supports 110 forms limiting on the sliding block 26 through the second connecting rod 29, which will also prevent the sliding block 26 from sliding upward along the sliding rails 25. Therefore, the sliding rails 25 may also be designed to be used only to guide the sliding block 26; and when the operating mechanism 100 is in the opened or tripped state, the sliding rails 25 will not form limiting on the sliding block 26.

A layout mode of the operating mechanism 100 in a fourth embodiment is shown in FIG. 9:

as shown in FIG. 9, the re-buckle 15, the lock buckle 13, the jumping pin 16 and the first crank 30) are all disposed on two bracket side plates of the mechanism bracket 50; one end of the jump buckle 60 is pivotally disposed on the bracket side plates, and the other end of the jump buckle 60 is in locking fit with the lock buckle 13; the re-buckle 15 and the lock buckle 13 are disposed on one side of the V-shaped groove, and a bracket connecting plate of the mechanism bracket 50) is located on the other side of the V-shaped groove: one end of the rocker arm leg of the racket arm 45 is pivotally disposed at the bottom of the V-shaped groove: one end of the first crank 30 is rotatably connected to the middle part of the jump buckle 60, the other end of the first crank 30 is rotatably connected to one end of the first connecting rod 27, and the other end of the first connecting rod 27 is in driving connection to the sliding block 26; and the sliding rails 25 are disposed on the bracket side plates, and the two V-shaped grooves are formed in two ends of the bracket side plates respectively and have opposite opening directions. Two second connecting rods 29 are respectively disposed on both sides of the bracket side plates, and are rotatably connected to both ends of the sliding block 26. The two sets of second connecting rod mechanisms are respectively disposed on both sides of the two bracket side plates, one ends of the two second cranks 19 are rotatably disposed on the two bracket side plates, the middle parts of the two second cranks 19 are rotatably connected to the two second connecting rods 29, the other ends of the two second cranks 19 are rotatably connected to the two second connecting rods 35, one ends of the two third cranks 36 are rotatably disposed on the two bracket side plates respectively, and the other ends of the two third cranks 36 are rotatably connected to the two second connecting rods 35.

In order to better illustrate the structure and principle of the operating mechanism 100, a cooperative relationship of respective components of the operating mechanism 100 are described in detail below in three states (closed, opened and tripped states), to be specific:

as shown in FIGS. 1-3, 4-6, and 10-12, two ends of a swing stroke of the rocker arm 45 are a first stroke end and a second stroke end, respectively: two ends of the energy storage spring 22 are a first spring end and a second spring end respectively, which are connected to the rocker arm assembly and the first crank 30 respectively: and the axis of the energy storage spring 22 is a first axis, a first axis side and a second axis side are respectively located on both sides of the first axis. As shown in FIGS. 1, 4 and 10, in the case that the operating mechanism 100 is in the closed state, the rocker arm 45 is located at the first stroke end, the re-buckle 15 is in limiting fit with the lock buckle 13, the lock buckle 13 is in locking fit with the jump buckle 60, the crank limiting portion 31 is in limiting fit with the jump buckle 60 to prevent the first crank 30) from rotating in the first direction, and the axis of the sixth shaft 67 is located at the first axis side. As shown in FIGS. 2, 5 and 11, in the case that the operating mechanism 100 is in the opened state, the rocker arm 45 is located at the second stroke end, the re-buckle 15 is in limiting fit with the lock buckle 13, the lock buckle 13 is in locking fit with the jump buckle 60, the crank limiting portion 31 releases the limiting fit from the jump buckle 60, the reset structure 42 is in limiting fit with the jump buckle 60, and the sliding block 26 is in limiting fit with the sliding rails 25 to prevent the first crank 30 from rotating in the second direction through the first connecting rod 27. The first and second directions are opposite to each other, and the axis of the sixth shaft 67 is located at the second axis side. Further, as shown in FIGS. 3, 6 and 12, in the case that the operating mechanism 100 is in the tripped state, the rocker arm 45 is located in the middle of its swing stroke, the re-buckle 15 releases the limiting fit from the lock buckle 13, the lock buckle 13 releases the locking fit from the jump buckle 60, the crank limiting portion 31 is in limiting fit with the jump buckle 60, the reset structure 42 is in limiting fit with the jump buckle 60, the sliding block 26 is in limiting fit with the sliding rails 25, and the axis of the sixth shaft 67 is located at the first axis side. The operating mechanism 100 can switch to the opened state after rebuckle from the tripped state.

It should be pointed out that the "rebuckle" of the operating mechanism 100 refers that the lock buckle 13 and the jump buckle 60 restore the locking fit, and the re-buckle 15 and the lock buckle 13 restore the limiting fit.

An embodiment of the moving contact mechanism 1*c* is shown in FIGS. 4-6, and 13-14: the moving contact mechanism 1*c* includes a contact support 110, a moving contact and a contact spring 23, wherein the moving contact is disposed on the contact support 110 and can rotate synchronously therewith, and the moving contact can rotate relative to the contact support 110. One end of the contact spring 23 is connected to the moving contact, and the other end of the contact spring 23 is connected to the contact support 110. When the moving contact and the static contact 18 are closed, a first acting force is applied to the moving contact, so that the moving contact presses the static contact 18. Further, as shown in FIGS. 4-6, and 13-14, one end of the contact spring 23 is connected to the moving contact through a first spring shaft 92, and the other end of the contact spring 23 is rotatably connected to the contact support 110 through a second spring shaft 112. Further, as shown in FIGS. 4-6, and 13-14, the moving contact includes a moving conductive rod 90, and a moving contact point 94 disposed at one end of the moving conductive rod 90, wherein the moving conductive rod 90 is provided with a conductive rod clamping groove cooperating with the first spring shaft 92.

Figure 13:
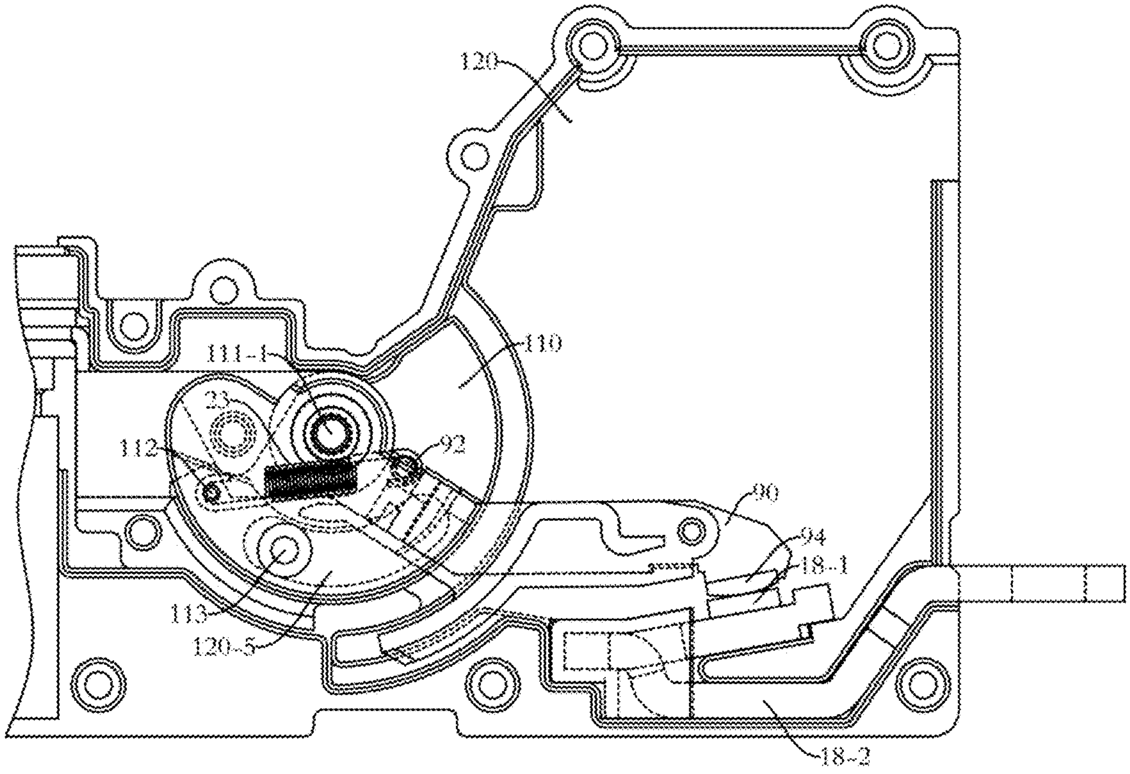
FIG. 13 is a schematic structural diagram of the circuit breaker pole of the present invention, in which at least an internal structure of a moving contact mechanism is shown, and a moving contact mechanism and a static contact are in a closed state.

As shown in FIGS. 13-14, the static contact 18 includes a static conductive plate 18-2, and a static contact point 18-1 disposed on the static conductive plate 18-2, wherein the static conductive plate 18-2 includes a first plate of the static conductive plate opposite to the moving conductive rod 90, and the moving conductive rod 90 and the first plate of the static conductive plate have opposite current directions.

The contact spring 23 may also achieve the locking of the moving contact, to be specific: two ends of the contact spring 23 are a third spring end and a fourth spring end respectively, wherein the third spring end is connected to the moving contact, the fourth spring end is connected to the contact support 110, a geometric axis of the contact spring 23 is a second axis, and the second axis coincides with a connecting line between the third spring end and the fourth spring end. As shown in FIG. 14, the second axis is kept on one side of the rotation axis (the tenth axis 111*s*) of the contact support 110 when the moving contact 9 is normally closed or opened, such that the moving contact is kept in a normally closed position or a normally opened position. The moving contact rotates relative to the contact support 110 when the moving contact is repelled by an electric repulsion force generated by a short-circuiting current: and the moving contact drives the contact spring 23 to rotate around the fourth spring end, so that the second axis swings to the other side of the rotation axis (the tenth axis 111*s*) of the contact support 110, such that the moving contact remains in a temporary breaking position. The moving contact mechanism has a simple structure. The contact spring realizes the overtravel of the moving contact to ensure the reliable contact between the moving contact and the static contact: and the contact spring locks the moving contact in the temporary breaking position when the moving contact is repelled by an electric repulsion force generated by a short-circuiting current, so that the moving contact does not rebound in the occurrence of a short-circuit fault, which ensures the reliable breaking of the moving contact and the static contact. It should be pointed out that when the moving contact is located in the temporary breaking position, if the operating mechanism is switched from the closed state to the opened state, the moving contact 9 automatically acts from the temporary breaking position to a normal disconnecting position.

As shown in FIG. 13 and FIG. 14, the contact support 110 is rotatably disposed around a thirteenth shaft 111-1 in the unit housing 120 of the circuit breaker pole 300 or rotatably disposed between two insulating partitions.

It should be pointed out that in the present application, the "shaft" is not limited to the traditional columnar structure, but broadly refers to a structure that achieves a rotational connection between multiple structures, such as a cylindrical boss/protrusion, an annular protrusion, a rivet, or a screw, which will not be repeated herein.

The above content is a further detailed description of the present invention in conjunction with specific preferred embodiments, but it cannot be regarded that the specific embodiments of the present invention are limited to these descriptions. For a person of ordinary skill in the art to which the present invention belongs, without departing from the idea of the present invention, a number of simple deductions or replacements may be made, which should be regarded as falling within the protection scope of the present invention.

The invention claimed is:

1. An operating mechanism of a circuit breaker, comprising a mechanism bracket, a jump buckle, a lock buckle, a rocker arm assembly, an energy storage spring, a first crank, and a first connecting rod assembly, wherein the jump buckle, the lock buckle and the rocker arm assembly are pivotally disposed on the mechanism bracket respectively; the lock buckle is in locking fit with the jump buckle; one end of the first crank is rotatably connected to the jump buckle, and an other end of the first crank is connected to the first connecting rod assembly through a fifth shaft; one end of the energy storage spring is connected to the fifth shaft, and an other end of the energy storage spring is rotatably connected to the rocker arm assembly; the operating mechanism further comprises a second connecting rod assembly; the second connecting rod assembly comprises a second crank pivotally disposed around a tenth axis, a third connecting rod, and a third crank pivotally disposed around an eleventh axis; the second crank is also rotatably connected to the third connecting rod through an eighth shaft; the third connecting rod is also rotatably connected to the third crank through a ninth shaft; the first connecting rod assembly is also rotatably connected to the second crank through a seventh shaft; the tenth axis, an axis of the eighth shaft, an axis of the ninth shaft and the eleventh axis are spaced in parallel; an axis of the seventh shaft and the tenth axis are spaced in parallel; the tenth axis coincides with a rotation axis of a moving contact mechanism of the circuit breaker, and the eighth shaft is in driving connection to the moving contact mechanism to drive the moving contact mechanism to rotate; or the eleventh axis coincides with the rotation axis of the moving contact mechanism, and the ninth shaft is in driving connection to the moving contact mechanism to drive the moving contact mechanism to rotate.

2. The operating mechanism of the circuit breaker according to claim 1, wherein the second crank is pivotally disposed around the tenth axis on the mechanism bracket or the circuit breaker housing of the circuit breaker; the third crank is pivotally disposed around the eleventh axis on the mechanism bracket or the circuit breaker housing; one end of the second crank is pivotally disposed around the tenth axis, and an other end of the second crank is rotatably connected to one end of the third connecting rod through the eighth shaft; the seventh shaft is located between both ends of the second crank; an other end of the third connecting rod is rotatably connected to one end of the third crank through the ninth shaft; and an other end of the third crank is pivotally disposed around the eleventh axis.

3. The operating mechanism of the circuit breaker according to claim 1, wherein the tenth axis, an axis of the eighth shaft, an axis of the ninth shaft and the eleventh axis are located at four vertices of a parallelogram, respectively.

4. The operating mechanism of the circuit breaker according to claim 1, wherein the mechanism bracket comprises a seventh shaft avoidance groove, and a shape of the seventh shaft avoidance groove matches a movement trajectory of the seventh shaft.

5. A circuit breaker, comprising the operating mechanism according to claim 1.

6. The operating mechanism of the circuit breaker according to claim 1, wherein the first connecting rod assembly comprises a first connecting rod, a sliding block and a second connecting rod; the operating mechanism further comprises sliding rails; the first crank is rotatably connected to one end of the first connecting rod through a fifth shaft, and an other end of the first connecting rod is rotatably connected to the sliding block; the sliding block is also rotatably connected to one end of the second connecting rod, and an other end of the second connecting rod is rotatably connected to the second crank through the seventh shaft; and the sliding block is slidably disposed in the sliding rails.

7. The operating mechanism of the circuit breaker according to claim 6, wherein the sliding rails are disposed on the mechanism bracket or disposed on the circuit breaker housing of the circuit breaker.

8. The operating mechanism of the circuit breaker according to claim 6, wherein the sliding block is in a limiting fit with the sliding rails to prevent the sliding block from sliding while the operating mechanism is in an opened state or a tripped state.

9. The operating mechanism of the circuit breaker according to claim 8, wherein the sliding block comprises a sliding shaft and track blocks, with one track block of the track blocks being disposed on each of both ends of the sliding shaft; and each track block of the track blocks is in sliding and limiting fit with one sliding rail of the sliding rails.

10. The operating mechanism of the circuit breaker according to claim 6, wherein two ends of a swing stroke of the rocker arm assembly are a first stroke end and a second stroke end, and two ends of the energy storage spring, which are connected to the rocker arm assembly and the fifth shaft, are a first spring end and a second spring end, respectively;

in the case that the operating mechanism is in a closed state, the rocker arm assembly swings toward the second stroke end and drives the first spring end to rotate around the second spring end, until the energy storage spring turns past a first dead center position; the energy storage spring drives the first crank to rotate in a second direction and drives the rocker arm assembly to swing to the second stroke end; the first crank drives the sliding block through the first connecting rod to slide along the sliding rails till being limiting fit with the first crank, thereby preventing the first crank from rotating in the second direction; the operating mechanism is switched to an opened state; and in the case that the operating mechanism is in the opened state, the rocker arm assembly swings toward the first stroke end and drives the first spring end to rotate around the second spring end, until the energy storage spring turns past the first dead center position; the energy storage spring drives the first crank to rotate in a first direction, such that a crank limiting portion of the first crank is in a limiting fit with the jump buckle, thereby preventing the first crank from rotating in the first direction; meanwhile, the energy storage spring drives the rocker arm assembly to swing to the first stroke end, and the operating mechanism is switched to a closed state; and the first direction and the second direction are opposite to each other.

11. The operating mechanism of the circuit breaker according to claim 10, wherein the operating mechanism further comprises a re-buckle pivotally disposed on the mechanism bracket, the re-buckle being in limiting fit with the lock buckle;

in the case that the operating mechanism is in the closed state, the re-buckle rotates to release the limiting fit from the lock buckle, and the lock buckle rotates to release the locking fit from the jump buckle; the jump buckle rotates and drives the first crank to rotate synchronously, the first crank drives the sliding block through the first connecting rod to slide along the sliding rails till being in limiting fit with the sliding rails, thereby preventing the jump buckle from continuing to rotate; the energy storage spring drives the rocker arm assembly to swing to the second stroke end till a reset structure of the rocker arm assembly is in limiting fit with the jump buckle, and the operating mechanism is switched to a tripped state; and in the case that the operating mechanism is in the tripped state, the rocker arm assembly swings to the second stroke end, and the rocker arm assembly drives the jump buckle through the reset structure to rotate to be in locking fit with the lock buckle; and meanwhile, the lock buckle rotates to be in limiting fit with the re-buckle, and the operating mechanism is switched to the opened state.

* * * * *